Nov. 15, 1955  F. ANGST  2,723,406
SCREW-CUTTING ATTACHMENT FOR MACHINE TOOLS
HAVING A REVERSIBLE WORKING SPINDLE
Filed Sept. 13, 1951
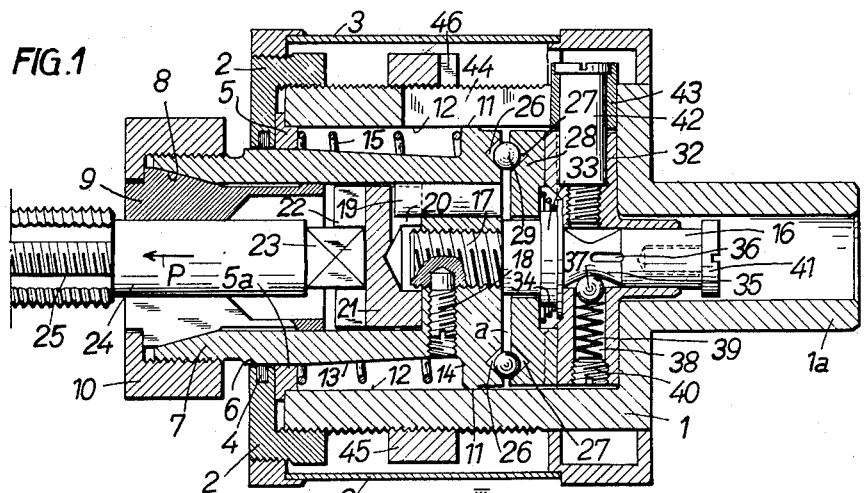
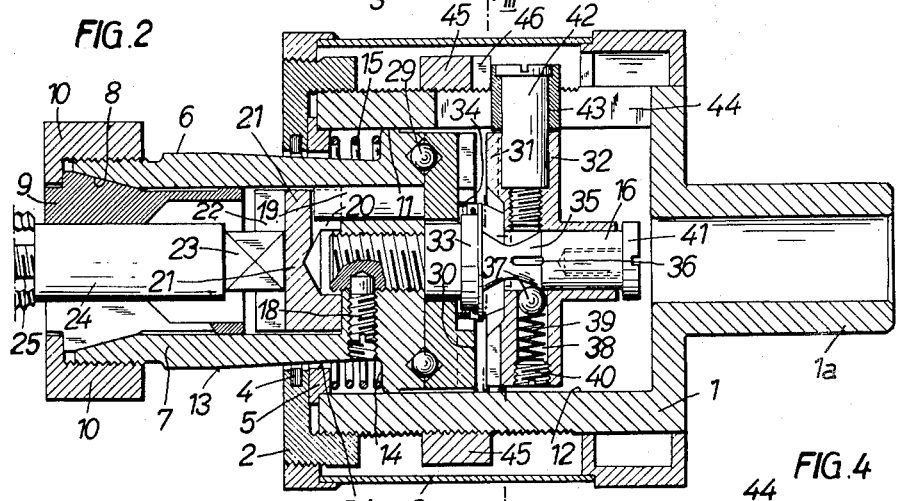
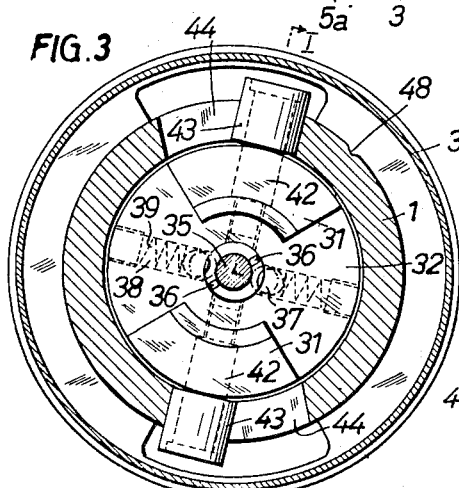
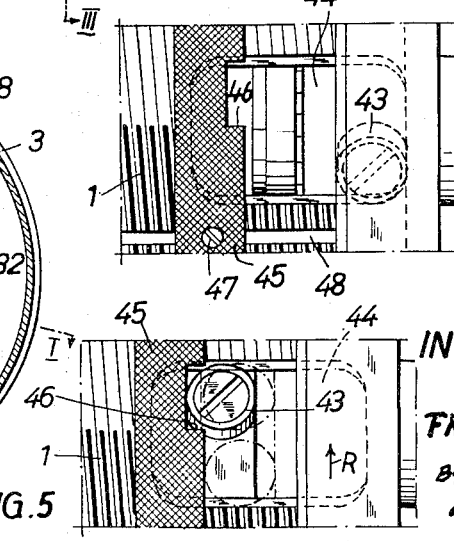
INVENTOR:
FRITZ ANGST 2,723,406

SCREW-CUTTING ATTACHMENT FOR MACHINE TOOLS HAVING A REVERSIBLE WORKING SPINDLE

Fritz Angst, Ulisbach-Wattwil, Switzerland

Application September 13, 1951, Serial No. 246,469

Claims priority, application Switzerland September 22, 1950

3 Claims. (Cl. 10—129)

My invention relates to an improved screw cutting attachment for machine tools in which the direction of rotation of the working spindle is reversible. The main object of my invention is to afford an accurate and simple adjustment of the desired length of thread on the workpiece, a frictionless and shock-free idling of the cutter when the operation of cutting or tapping has been completed, and an automatic complete engagement of the clutch after the direction of rotation of the machine-tool spindle-head has been reversed.

I attain these and related objects by the screw-cutting attachment shown, by way of example, in the accompanying drawing in which—

Fig. 1 shows a section on the line I—I of Fig. 3 through the attachment at the start of the cutting operation;

Fig. 2 depicts a similar section, but in idling position;

Fig. 3 is a cross-section on the line III—III of Fig. 2, and

Figs. 4 and 5 illustrate vertical part sections through a detail of the attachment at the beginning and on completion of the cutting operation respectively.

In the drawing, 1 is a drumlike, externally threaded housing of which the sleeve extension 1a serves for setting the mechanism, for example, in the tailstock of a lathe or in the spindle head of a drilling machine. On the free end face of housing 1 is mounted a screw cap 2 which is provided with a packing 4 and external threads for securing a protective tube 3 enveloping the housing 1. Between cap 2 and said free end of the housing 1, is clamped a bearing collar 5 of which the internal surface 5a is destined for co-action with the cylindrical surface 6 of a hollow shank 7. The front end portion of the latter is provided with an outwardly-diverging conical inside face 8 against which is forced a corresponding conical chuck 9 through a screw cap 10 which is mounted on the external threads of shank 7.

The inner end portion of shank 7 has a cylindrical bearing face 11 which bears on the cylindrical inside wall 12 of housing 1 in an axially movable and rotatable relation. The outside wall of shank 7 is conically-shaped between the bearing faces 6 and 11, a shoulder 14 being provided on the inner end portion of shank 7. A spring 15 at one end bears on the collar 5 and its other end, on said shoulder 14 of shank 7. In the shank 7 is secured a central stud 16 having a threaded front portion 17, the said stud being inserted through the rear portion of shank 7 and located in such position by a grub screw 18. Two pins 19 (of which only one is shown) project into the hollow space of shank 7 and are engaged in a rear cross-groove 20, of an inset 21. In a front cross-groove 22 of inset 21 is engaged the square end portion of the stem 24 of a die or tap 25.

On the inner end face of shank 7 are provided a plurality of circularly-disposed conical recesses 26 which, together with corresponding recesses 27 in the end face of a disclike first clutch element 28, form cages for driving balls 29. The first clutch element 28 has sectorlike claws 30 adapted for co-action with the recesses disposed between corresponding claws 31 on the adjacent face of a second clutch element 32. The central stud 16, on which the two clutch elements 28, 32 are rotatably mounted, comprises an integral collar 33 which separates the two clutch elements and forms the abutment of a conical spring 34 which is mounted on the element 28. Adjacent to said collar 33, the stud 16 has a central portion 35 which is formed as a double cone of which the extension is again cylindrical and serves as bearing for the clutch element 32.

The outside cone portion of the central part 35 has two axial grooves 36 and co-acts with balls 37 which are disposed in radial bores 38 of the clutch element 32. The balls 37 are loaded by springs 39 which are disposed in the bores 38 and supported on grub screws 40. The free cylindrical end portion of stud 16 is provided with a stop screw 41 of which the head is of larger diameter than the cylindrical stud end.

Two rollers 43 (one only being visible in Figs. 1 and 2) are pivoted on threaded pins 42 to the clutch element 32 and are movable in recesses 44 of the housing 1 (Figs. 4, 5). A set collar 45 which is axially movable on the external threads of housing 1 and of which the end face adjacent the clutch element 32 has recesses 46, serves as a stop for the rollers 43 and for setting the desired length of thread to be cut in the workpiece. In order to permit to positively locate the collar 45 with respect to its axial position for certain lengths of thread to be cut, the collar 45 is provided with set screws 47 which are engageable in longitudinal grooves 48 of the housing (Fig. 4).

*Mode of operation*

It is assumed that the sleeve extension 1a is set in the tailstock of a lathe provided with a movable spindle head, and that the set collar 45 is set on the housing 1 in accordance with the length of the external righthanded thread to be cut and is fixed by means of the set screw 47 in the groove 48, for example as shown in Fig. 4. The mechanism is supposed to be in the position shown in Fig. 1.

The workpiece, having been clamped in the lathe spindle head after the lathe has been put in operation, is rotating counterclockwise. The tool 25 of the attachment clamped in the tailstock is moved up to the workpiece and pressed against the same during approximately a revolution thereof, i. e. until the workpiece has been positively engaged by the tool. The tool via the shank 7, the engaged clutch 28/32 and the rollers 43 which abut against the respective edge of the recess 44, through the stationary housing 1 is secured against rotation. The shank 7 in the initial position shown in Fig. 1 is guided at two points by the co-acting surfaces 5a, 6 and 12, 11.

When the tool 25 engages the workpiece, the latter tends to drive the shank 7 thereby causing the clutch element 28, on account of the wedge action of the balls 29 in the cages 27/26, to be raised against the action of spring 34 from the adjacent face of shank 7 until it contacts the collar 33, thereby affording play to the parts 7 and 28.

During the cutting operation, the tool 25 and the parts 7, 16 and 28, 32 connected thereto are pulled to the left in Fig. 1 (see arrow P) in accordance to the screw pitch, the rollers 43 moving along the respective edge of the recesses 44 (Fig. 4) until contacting the set collar 45. On continued rotation of the workpiece, the clutch element 28 is further pulled to the left through a distance defined by the height of the claws 30, until the clutch elements 28, 32 are disengaged from each other. The clutch element 28, which now is freely rotatable, through spring 34 is pressed against the endface of the freely rotatable shank 7 and the two clutch elements 28, 32 thus are separated from each other by the clearance *a* (Fig. 1)

present between the parts 7 and 28 during the cutting operation. Such arrangement ensures, upon completion of the cutting operation, a frictionless and shockfree idling run of the tool and excludes the risk of any undesired clutch engagement as may be caused, for example, by vibrations.

Concurrently with the disengagement of the clutch portions 32 and 28, the cone portion 35 is additionally tensioned by virtue of the balls 37 engaging the portion 35. The balls 37 then run freely over the grooves 36 on the rotating cone face. The proper length of thread to be cut thus is defined by the total axial movement of the tool 25 and is greater than the setting length of the collar 45, the difference being given by the height of the clutch claws and the path of movement defined by pressing of the tool.

In order to release the threaded work piece, the direction of rotation of the lathe spindle head is reversed so that the workpiece now rotates clockwise and, thus, also the shank 7, the clutch element 28 and the stud 16. The balls 37 which during the forward movement of the tool 25 have been dislodged through the conical portion 35 from the narrowest point thereof, slide on the cone face and will be engaged in the longitudinal grooves 36 during the rotation of stud 16. Such engagement gives origin to a temporary engagement of the parts 16 and 32 and, since the stud 16 now rotates in direction of the arrow R (Fig. 5), to a rotation of the clutch element 32 until the rollers 43 thereof abut against the opposite edge of the recesses 44. As soon as, on further rotation of the clutch part 28, the claws 30, 31 are turned in such manner relatively to each other that they are capable of interengagement, the balls 37 under the action of the springs 39 slide back to the narrowest point of cone 35, since the rollers 43 and thus the clutch element 32 through the recess 46 of collar 45 are permitted to move forward further. The recesses 46 are selected of such size that, owing to said movement of the clutch element 32, the latter again is engaged to the element 28. By virtue of such arrangement, the clutch is automatically and positively thrown in after the direction of rotation of the lathe spindle head has been reversed. The tool 25 thus is prevented through the engaged clutch from further following the rotation; the tool therefore is disengaged from the workpiece and, together with the parts coupled thereto, is slid back in accordance with the screw pitch.

When the tool 25 is in its advanced position (Fig. 2), the stop screw 41 in stud 16 prevents the clutch elements from being so moved rearwardly, for example on account of blows or other vibration, that the balls 37 would be situated on the cylindrical end portion of stud 16 and that the cone 35 and its grooves 36 would become ineffective.

It will be noted yet that, owing to the conical configuration of the outer surface 13 of shank 7, which surface adjoins the surface 6 thereof, the shank 7 is no longer guided by the collar 5 when the shank 7 has moved forward. In this position, therefore, the shank 7 also bears at only two points, namely through the tool 25 on the workpiece and through the face 11 on the housing 1. When the workpiece is running untrue, the tool 25 thus may oscillate.

By turning the collar 45 so that the recess 46 adjoins one or the other longitudinal edge of recess 44, right-handed or left-handed threads may be cut, as desired.

By inserting a suitable front part, in place of shank 7, dies may be set into the attachment.

What I claim as new and desire to secure by Letters Patent, is:

1. In a screw threading attachment for machine tools having a reversible working spindle, the improvement comprising a housing having a shank reciprocably mounted therein and said housing adapted to be connected to said spindle, a stud having a conical portion therein secured to the center of said shank, said conical portion having an axial groove therein, a plurality of spring loaded balls engaging said conical portion and adapted to coact with said groove, a clutch mounted on said stud and adapted to prevent rotation of said shank when cutting threads, said clutch comprising a first clutch element in which said balls are mounted and having an abutment roller for limiting the work stroke of said shank, a second, spring loaded clutch element adapted to engage said first clutch element, said housing having a recess therein, said abutment roller being axially and rotatably movable within said recess, a set collar movably carried by said housing and engaging said abutment roller when said shank has completed its working stroke to separate said clutch elements, said collar being provided with a recess, said first clutch element on reversal of the direction of rotation of the working spindle being partly rotated by engagement of the balls in thhe groove in the conical portion of said stud thereby engaging the abutment roller in the collar recess for permitting axial movement of said first clutch element for interengaging said first and second clutch elements.

2. The combination of claim 1, said second clutch element having driving balls coacting with the shank to provide axial play between said shank and said second element when said clutch elements are engaged, and eliminating such play when said clutch elements are disengaged through the spring loading of the second element affording an idling rotation of the shank.

3. The combination of claim 1 wherein a stop screw is provided on the end portion of said stud to prevent said first clutch element from sliding off of said stud, said shank being provided with two spaced, cylindrical, peripheral faces and a connecting intermediate conical peripheral face, and a bearing collar engaging one of said cylindrical faces when the shank is in withdrawn position in the housing, said bearing collar being disengaged from the cylindrical face as the shank is advanced from the housing and the conical face thereof passes through the bearing collar.

References Cited in the file of this patent

UNITED STATES PATENTS

| | | |
|---|---|---|
| 748,018 | Rowe | Dec. 29, 1903 |
| 1,290,427 | Velk | Jan. 7, 1919 |
| 2,099,489 | Lambert | Nov. 16, 1937 |
| 2,184,779 | Kiehne | Dec. 26, 1939 |

FOREIGN PATENTS

| | | |
|---|---|---|
| 650,454 | Germany | Sept. 2, 1937 |